H. W. PLEISTER.
BOLT ANCHOR.
APPLICATION FILED JAN. 20, 1917.

1,248,007.

Patented Nov. 27, 1917.
2 SHEETS—SHEET 1.

INVENTOR
Henry W. Pleister
BY
Alan M. Johnson
ATTORNEY

H. W. PLEISTER.
BOLT ANCHOR.
APPLICATION FILED JAN. 20, 1917.
1,248,007.
Patented Nov. 27, 1917.
2 SHEETS—SHEET 2.
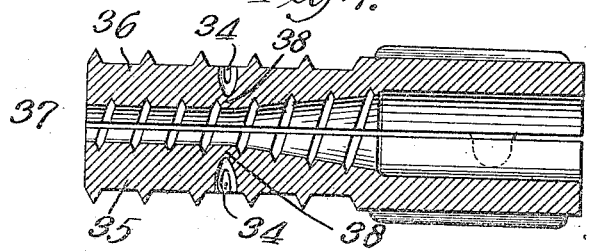
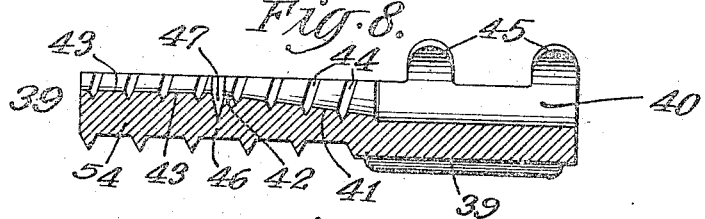
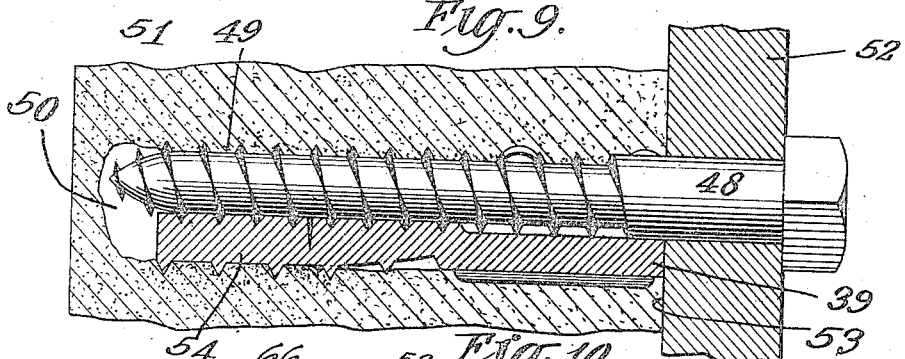
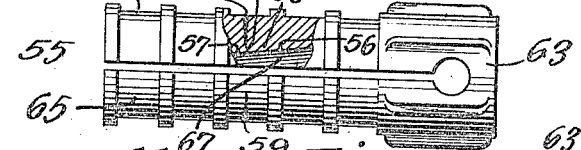
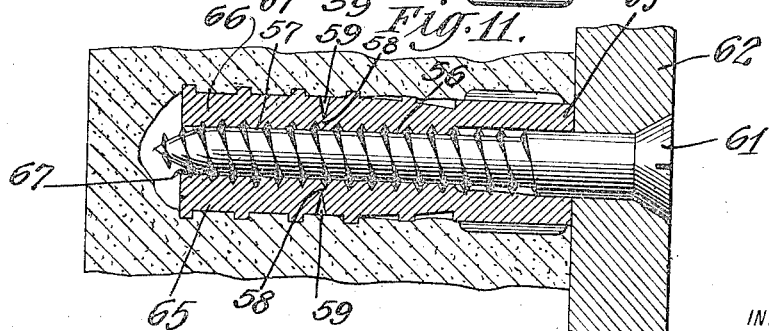
INVENTOR.
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL.

BOLT-ANCHOR.

1,248,007.   Specification of Letters Patent.   Patented Nov. 27, 1917.

Original application filed September 20, 1916, Serial No. 121,104. Divided and this application filed January 20, 1917. Serial No. 143,426.

*To all whom it may concern:*

Be it known that I, HENRY W. PLEISTER, a citizen of the United States, residing at Westfield, in the county of Union and State of New Jersey, have invented certain new and useful Improvements in Bolt-Anchors, of which the following is a specification, taken in connection with the accompanying drawings.

This application is a division of my copending application Ser. No. 121,104 filed Sept. 20, 1916, for improvements in bolt anchors.

My invention relates to bolt anchors.

In the present form of bolt anchors the maximum expansion is approximately at the extreme inner end of the anchor. In practice this is often a serious detriment in that the screw or other expanding member, having forced the bolt anchor out to its maximum expansion, binds and it is impossible to bring the head of the bolt or screw up flush with the work. This requires that the hole be enlarged entailing additional labor and expense, or that a different size bolt anchor be used.

By my invention I overcome this serious objection and give a longer surface of maximum contact or grip on the exterior of the bolt anchor, thereby giving an increased frictional hold and distributing this maximum grip over a larger area than with the present forms. My invention further permits the screw or bolt to coöperate with the bolt anchor with less effort, than in the present forms.

My present invention relates to providing a bolt anchor with weakening portions, in connection with the other features hereinafter set forth, and to certain details of construction all of which will be described in the specification and pointed out in the claims.

I have shown in the accompanying drawings several illustrative embodiments of my invention but of course it is to be understood that my invention is not to be confined simply to the forms illustrated except as required by the scope of the appended claims. In these drawings the same reference numerals refer to the similar parts in the several figures.

Figure 1 is a vertical section through a two part bolt anchor known as a two part lag shield, showing weakening portions, and having an axial bore, one part of which is inclined reaching its maximum inclination between the ends of the anchor and then merging into a substantially cylindrical bore, the weakening portions being preferably located adjacent to the maximum inclination of the inclined surface;

Fig. 7 is a detail view of another modified form showing a two part lag shield having weakening valleys on its outside;

Fig. 8 is a longitudinal vertical section through a one part bolt anchor, known as a one part lag shield, provided with my weakening portions;

Fig. 9 is a vertical section through the one part lag shield shown in Fig. 8, the support, and the work supported, showing the coöperating lag screw in side elevation;

Fig. 10 is a side elevation, partly broken away, of a ductile anchor provided with weakening portions; and Fig. 11 is a vertical section of the ductile anchor of Fig. 10, expanded and coöperating with a wood screw which is shown in side elevation.

Figure 1:
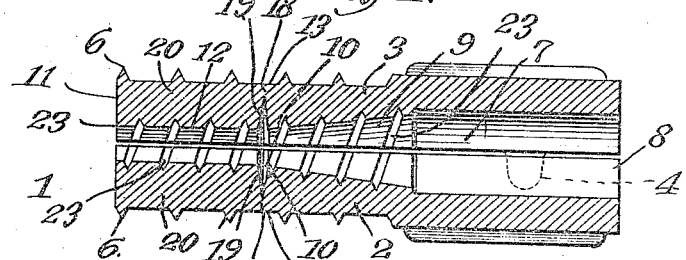

In the illustrative embodiments of my invention, 1, Fig. 1, is a lag shield form of two members 2 and 3 and provided with the usual clamping lugs 4, as is the common practice, only one being shown in this figure.

In the form of lag shields now on the market, the axial bore has an inclined substantially uniform taper extending from near one end to the other end of the shield. In coöperating with the lag screw, such as 5, the maximum expansion, in the old form, is approximately at a point equivalent to 6, 6. In my invention I form a lag shield with an axial bore 7 having an open throat 8, an inclined portion 9, which reaches its maximum inclination at the points 10, 10, some distance from the end 11 of the lag shield. From the points 10, 10 I form my axial bore with a substantially cylindrical surface 12, the surface being substantially parallel to the longitudinal axis of the bolt anchor. By my invention, the maximum grip instead of being confined at the end of the bolt anchor, as in the old form, is distributed along the surface of the bolt anchor from points 13, 13 to the points 6, 6, which distance of course may be varied. This gives a long surface of contact and increased frictional hold and insures the maximum grip over a larger area.

Figure 2:
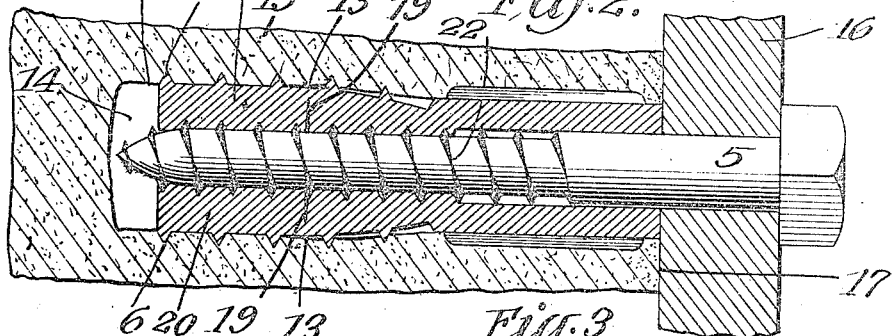
Fig. 2 is a vertical section through the two part lag shield of Fig. 1 shown expanded by the lag screw holding the work to the support.

In use the lag shield 1 is mounted in a hole 14 in a support 15, Fig. 2, and the lag screw 5 is then passed through the work 16, through the open throat 8 along the inclined portion 9 and the cylindrical surface 12 of the axial bore. As the lag screw passes through the open throat 8, there is no expansive coöperation between it and the lag shield 1, as it is desirable to have the expansion take place back from the face 17 of the support 15. Upon reaching the inclined surface 9, the expansion of the lag shield begins and continues comparatively sharply until the points 10, 10 of maximum inclination are passed, when the expansion is uniform.

To permit the ready expansion of the lag shield 1, I provide it with weakening portions 18, 18 in any suitable manner. In the form shown in Figs. 1 and 2, these weakening portions 18, 18 are formed by deep valleys 19, 19 which are preferably cast in the parts 2 and 3 of the lag shield when this shield is cast in the ordinary manner. These weakening portions 18, 18 permit the ends 20, 20 of the members 2 and 3 of the lag shield to bend or spring at these weakening portions which are preferably located adjacent to the points 10, 10 of the inclined surface 9, which points are the nearest approach to the axis, and in that manner tend to close up the valleys 19, 19 as shown in Fig. 2. It will, therefore, be seen that as the lag screw 5 travels home the maximum expansion, instead of being at the points 6, 6, as in the old form, is distributed over comparatively a large area of the wall 21 of the hole 14 lying between the points 6, 6 and the points 13, 13, the weakening portions 18, 18, permitting the more ready insertion of the lag screw by permitting the bending of the parts 2 and 3 at points adjacent to the maximum inclination of the inclined surface 9. In this form the male threads 22 of the lag screw 5 coöperate with the female screwthreads 23 of the lag shield, these latter being preferably cast in the sections 2 and 3 in the mold.

The same size lag shield and lag screw will hold work of different thicknesses 16 the same as more fully described in my said parent application, and in all cases the head of the lag screw or the wood screw, the latter being particularly used with the anchor shown in Figs. 10 and 11, can be instantly brought up flush against the work whatever its thickness may be without the screw jamming in a position where its head cannot be brought up snugly against the work. This is due to the fact that the surface of maximum expansion is extended over a relatively large portion of the surface of the lag shield and anchor so that the end of the screw can be brought anywhere along the cylindrical portion of the axial bore, or past the end of the lag shield or anchor, as the case may be, as may be found necessary to bring the head of the screw flush against the work and at the same time obtain the requisite maximum expansion of the lag shield or lead anchor. In the old form as previously noted, where the expansion is at the end of the shield, the lag screw or wood screw would often jam at this point before its head was brought flush with the work requiring the removal of the lag shield, or anchor, and the enlargement of the hole, or the use of a different size lag shield or anchor.

The weakening portions may be formed in my lag shields or lead anchors in other numerous ways. For purposes of illustration I have shown a few different ways of providing the weakening portions, but of course it is to be understood, that my invention is not to be limited to these particular forms, which are shown simply by way of example.

Figure 3:
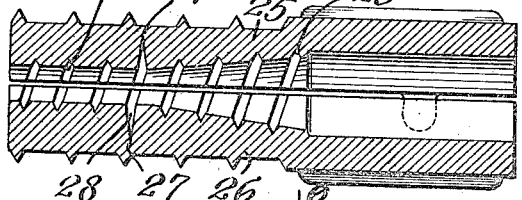
Fig. 3 is a vertical section of the two part lag shield showing a modified form of weakening portions formed by deepening one of the female screwthreads of the lag shield.

In Fig. 3 I have shown a bolt anchor 24 formed of sections 25 and 26, the weakening portions 27, 27 being formed by deepening one of the female screwthreads 28, the other female screwthreads 29, 29 being of the ordinary depth.

Figure 6:
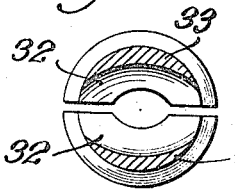
Fig. 6 is a transverse vertical section substantially on the line 6—6 of Fig. 4.
Figure 4:
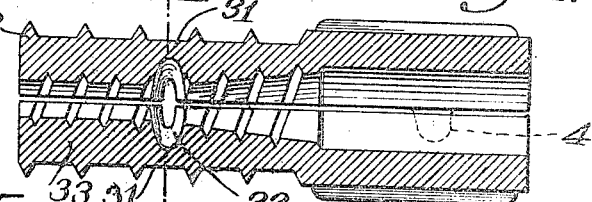
Fig. 4 is a vertical section of the two part lag shield showing a different manner of forming weakening portions by running a hole or aperture through both parts of the lag shield.
Figure 5:
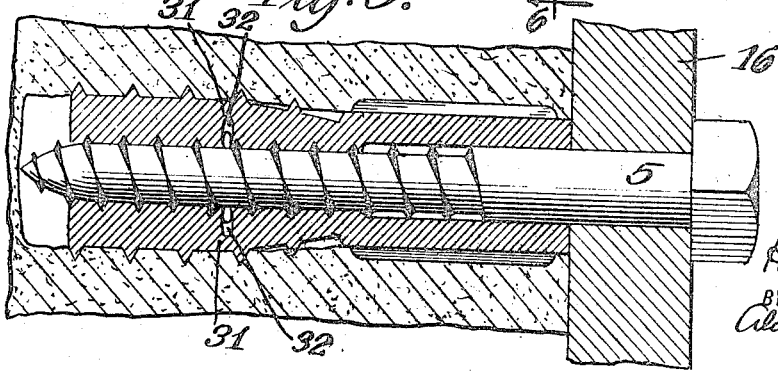
Fig. 5 is a vertical section showing the lag shield of Fig. 4 in its expanded position.

I may in some instances provide a bolt anchor 30, Figs. 4, 5 and 6, with weakening portions 31, 31 formed by making a hole or slot 32 directly through the two portions 33, 33 of the bolt anchor. In Fig. 5 I have shown the bolt anchor of Fig. 4 located in a wall and supporting the work, its action being the same as that previously described.

In some instances I may place valleys 34, 34, Fig. 7, in the parts 35 and 36 of the lag shield 37 forming weakening portions 38, 38.

I may also employ weakening portions, preferably located adjacent the point of nearest approach to the axis of the inclined surface of a one part lag shield as shown for example in Figs. 8 and 9.

In these figures the lag shield 39 is provided with an open throat 40 and with an inclined surface 41 reaching its maximum inclination at the point 42, and there merging into a parallel or semi-cylindrical surface 43. The lag shield is preferably provided with the female screw-threads 44 and also preferably with one or more lugs 45, 45. The weakening portion 46 is formed by casting a valley 47, which, as previously noted, for best results, should be located adjacent the point 42 of the inclined surface 41, the nearest approach to the axis. In this form the lag screw 48 coöperates with the inclined surface 41 and the semi-cylindrical surface 43 and also with that portion 49 of the wall of the hole 50 in the support 51 which is not covered by the lag shield 39. In this form the work 52 is held to the face 53 of the support, the same as in the other forms, the weakening portions 46 permitting the end 54 to bend with relation to the other portion of the lag shield which permits the more ready insertion of the lag screw in that the force required to bend the metal of the lag shield is very largely dispensed with.

Ductile anchors, screw anchors, or anchors, as they are known in the trade, may also be made in accordance with my invention.

In Figs. 10 and 11, I have shown an anchor 55 provided with the inclined surface 56, the cylindrical surface 57 and the weakening portions 58 formed by the exterior valleys 59, 59 which are located adjacent to the points of maximum inclination 60 of the inclined portion 56.

In these anchors the wood screw 61 supports the work 62 by passing through the collar 63 of the anchor 64 and expanding its two tines 65 and 66 by cutting its own threads in the inclined portion 56 and the cylindrical portion 57 of the axial bore 67. In this operation the weakening portions 58 give and permit the valleys 59, 59 to open slightly. Of course, it is to be understood that my invention may be used with a lag shield or lead anchor of any exterior configuration.

The walls of my bolt anchor are thinnest near one end and uniformly increase in thickness to a point intermediate the ends of the anchor, and from that point the walls continue with a substantially uniform thickness to the other end of the anchor.

One portion of the axial bore is in the form of a frustum of a cone whose base is near the entrance of the shield, its other end merging into substantially a true cylinder at a point located between the two ends of the shield.

It will be seen that when the expanding means coöperate with the axial bore, said bore is distorted into a substantially true cylindrical bore thereby distorting the forward exterior cylindrical surface of the bolt anchor into a frustum of a cone, which merges into the cylindrical exterior of the outer end of the bolt anchor.

In the different figures of the drawings, for purpose of illustration, I have somewhat exaggerated the preferred angle of the inclined portion of the axial bore.

Having thus described this invention in connection with several illustrative embodiments thereof, to the details of which I do not desire to be limited, what is claimed as new and what is desired to secure by Letters Patent is set forth in the appended claims.

1. In a bolt anchor an expansible member having an internal cavity, the surface of said cavity being tapered for part of its length, the other portion of the cavity being substantially cylindrical and provided with a weakening portion adjacent to the point where the tapered and cylindrical surfaces meet.

2. In a bolt anchor an expansible member having an internal cavity, the surface of said cavity being inclined with a uniform inward taper for part of its length, said inclination ceasing at a point between the ends of the anchor and continuing and merging into a cylindrical orifice to the farther extremity, said bolt anchor being provided with a weakening portion located adjacent to the point where the inclined interior surface merges into the cylindrical surface.

3. In a bolt anchor expansible members forming on their exterior substantially a cylinder and forming on their interior a bore coaxial with the anchor, said bore tapering to a smaller diameter as it approaches a point between extremities and from thence continuing with uniform diameter for the remainder of its surface to the opposite extremity, one or more of said expansible members being provided with a weakening portion.

4. In a bolt anchor, the combination of a plurality of expansible members comprising a hollow cylindrical shield screw-threaded upon its inner surface, said screw threaded surface being in the form of a frustum of a cone, whose base is near the entrance of the shield, the other end of the frustum of a cone merging into a true cylinder at a point located between the ends of the bolt anchor, and weakening sections provided adjacent said merging points, and a rotatable expanding member adapted to engage the screw-threaded interior surface.

HENRY W. PLEISTER.

Witnesses:
M. R. RYAN,
A. M. WILLIAMS.